Nov. 3, 1931. G. DE BEESON 1,829,790
AUTOMATIC AIRPLANE CONTROL
Filed Nov. 29, 1929 4 Sheets-Sheet 1

INVENTOR,
Geo. De Beeson;
BY F.E.Maynard,
ATTORNEY.

Nov. 3, 1931.  G. DE BEESON  1,829,790
AUTOMATIC AIRPLANE CONTROL
Filed Nov. 29, 1929  4 Sheets-Sheet 2
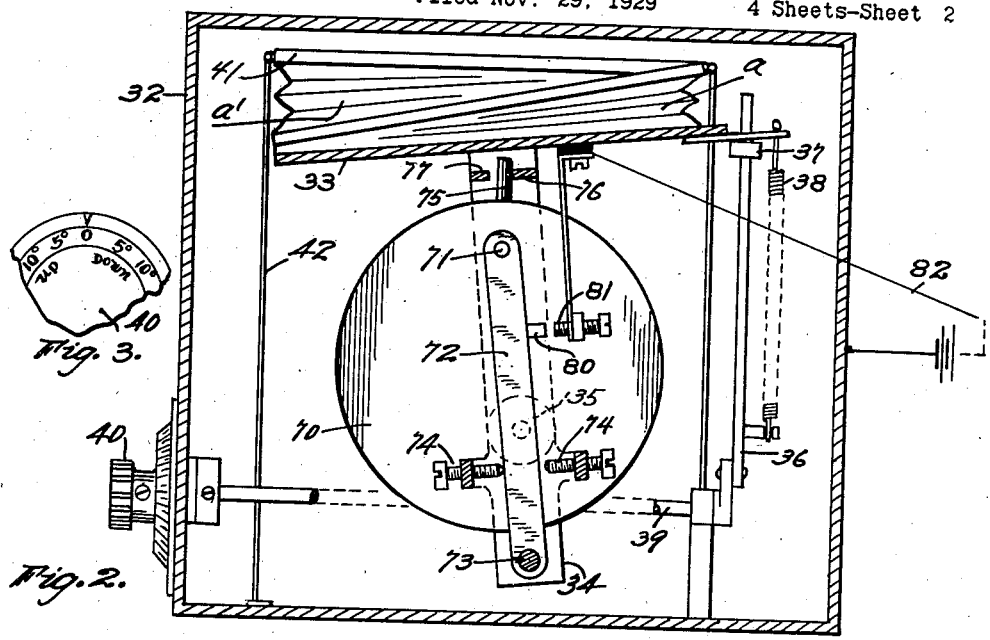
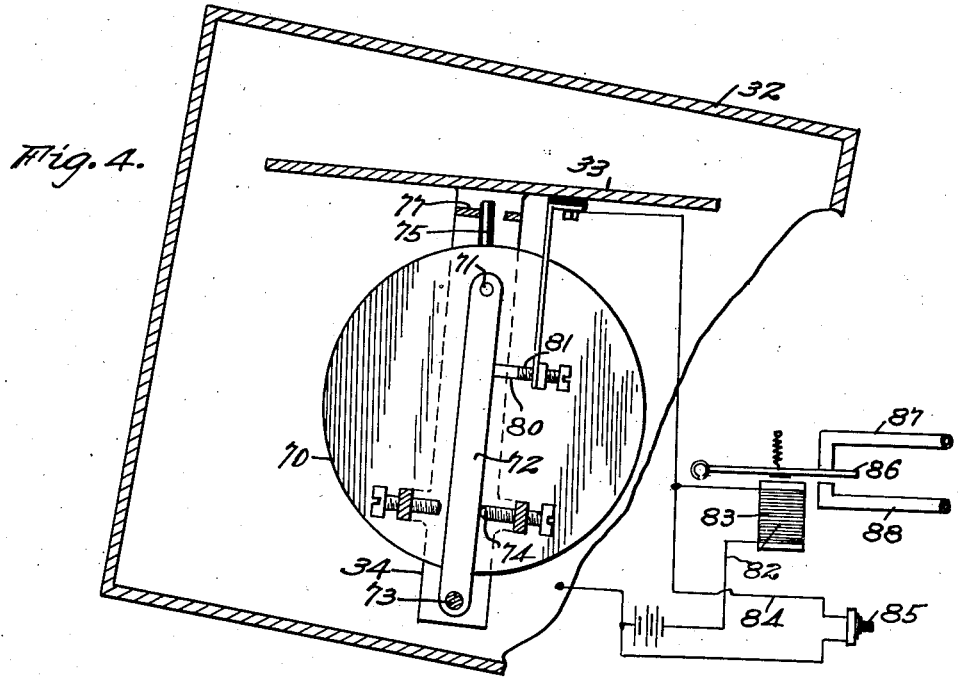
INVENTOR,
Geo. De Beeson;
BY
F. E. Maynard
ATTORNEY

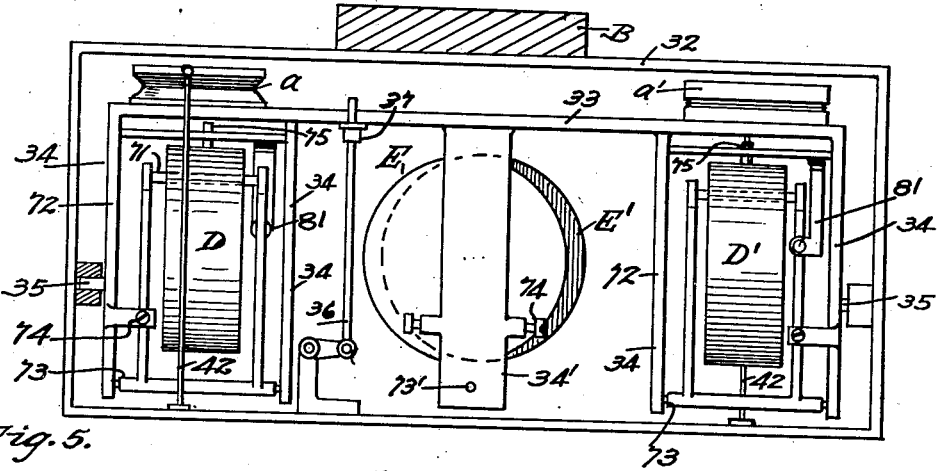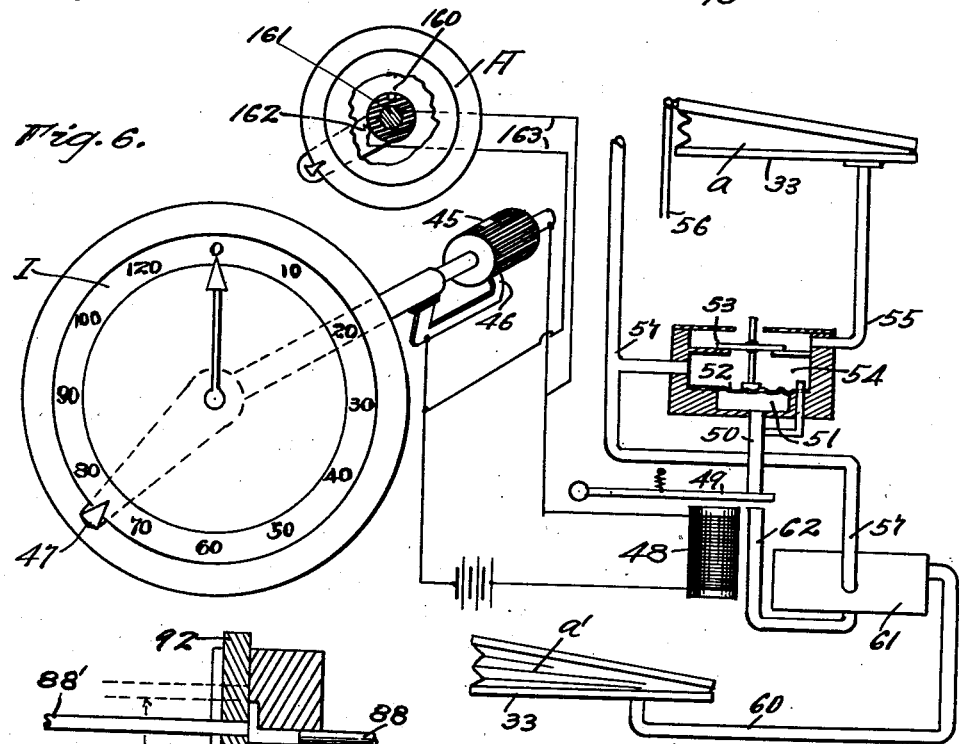

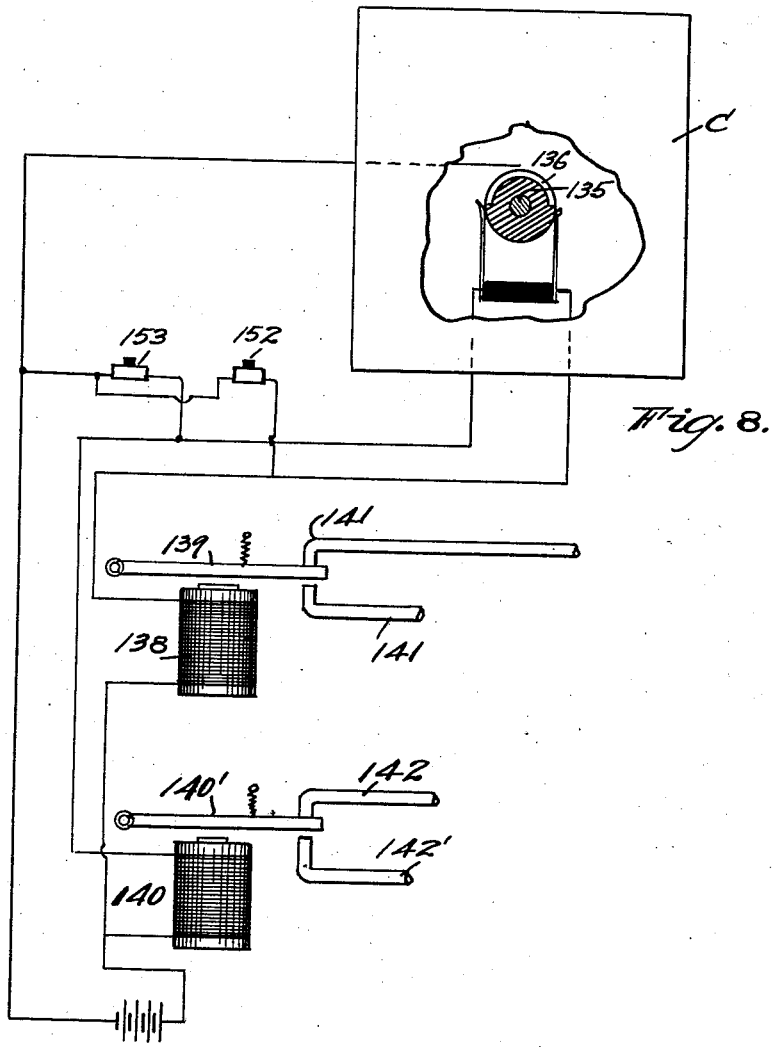

Patented Nov. 3, 1931

1,829,790

UNITED STATES PATENT OFFICE

GEORGE DE BEESON, OF HUNTINGTON PARK, CALIFORNIA

AUTOMATIC AIRPLANE CONTROL

Application filed November 29, 1929. Serial No. 410,461.

This invention relates to airplanes and more especially to a means for automatically flying the machine substantially without manual operation of the several control surfaces.

It is an object of the invention to provide a simple, reliable, effective and highly sensitive apparatus for automatically restoring the airplane to a given and normal longitudinal and transverse balance in the event that it tips or pitches to an undesired angle from the normal.

It is also an object to provide means for automatically positioning the ship at a safe flying speed following a stall which may occur from any cause.

More specifically an object is to provide a system of poises set in such relative positions as to cause automatic restoration of the ship to its proper flying angle or to a manually determined angle in the event that the ship pitches up or down or tips right or left beyond a normal position or beyond the desired or set position.

An object is to provide automatic means operative to control the ship and keep it on a set compass course.

It is an object to provide a control system which can be incorporated with a minimum degree of structural change of the standard aileron, rudder and elevator controls.

A further object is to provide a combined automatic stabilizer control and manual control in such interrelated organization that either may be operative for control without use of the stick.

It is an object to provide a safe flying speed means automatically operative in combination with a standard or appropriate type of air speed indicator whereby to bring the ship to a safe flying speed following a stall occurring from any cause.

A further object is to level ship out automatically after it has reached a given altitude.

An object is to provide an automatic rudder control means combined with an earth inductor compass or other steering instrument.

The invention consists in certain advancements in this art as set forth in the ensuing disclosure and having, with the above, additional objects and advantages, and whose construction, combination and details of means, and the manner of operation will be made manifest in the ensuing description of the herewith illustrative apparatus; it being understood that modifications, variations and adaptations may be resorted to within the scope, principle and spirit of the invention as it is more directly claimed thereinafter.

Figure 2 is a section and elevational view of one of the control poise units in its normal flying or set position.

Figure 3 is a fragmentary section of the pitch indicator dial.

Figure 4 is an elevational view and section showing the poise in its tipped or operative position to complete a relative valve operating circuit.

Figure 5 is a front elevation of the fixed poise box with a tiltable, poise-carrying frame therein.

Figure 6 is a diagrammatic view showing an air speed indicator and combined valve apparatus.

Figure 7 is a sectional view of a slide valve action.

Figure 8 is a diagrammatic view showing an associated earth inductor compass and rudder control valve devices.

Figure 1:
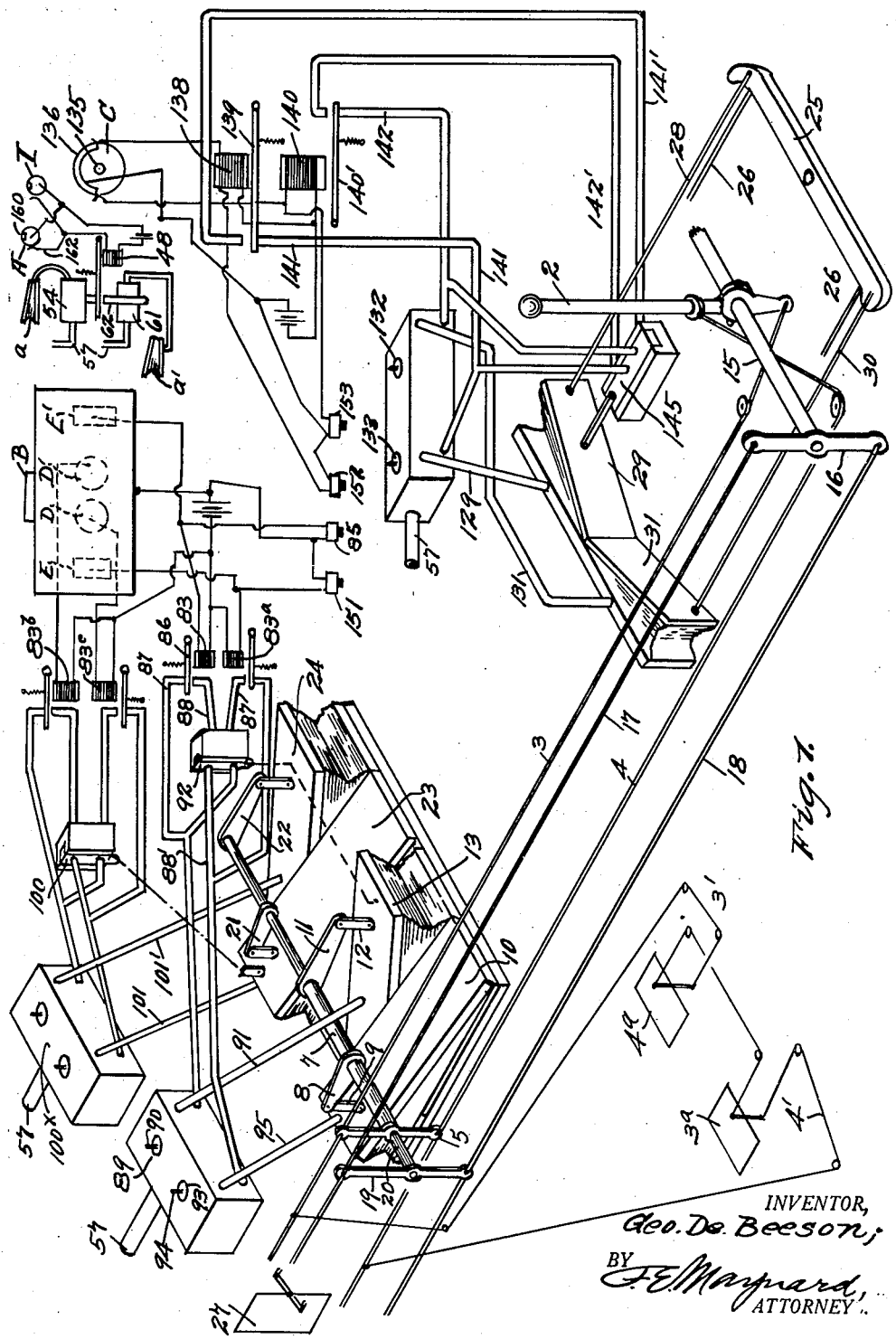
Figure 1 is a general diagrammatic and schematic view of the organized apparatus.

As here shown an airplane stick 2 has a set of lines 3 and 4 running back to a lever 5 which is fixed on a sleeve shaft 7 and this sleeve has an arm 8 linked at 9 to a power leaf 10 of a bellows. The sleeve shaft 7 also has an arm 11 linked at 12 to a bellows leaf 13.

The lever 5 is connected by lines 3'—4' to right and left wing ailerons 4a—3a in aileron apparatus associated with the stick; this operating the ailerons by the usual motions and the ailerons being also operated by the right and left control bellows leaves 10—12 under the control of certain automatic apparatus hereinafter more particularly described.

The stick 2 is also connected to a rock-shaft 15 having a lever 16 to which are attached cables 17 and 18 attaching to a lever 19 fixed on a spindle 20 passing through the sleeve shaft 7 and having reverse arms 21 and 22 which respectively attach to bellows leaves 23 and 24.

A standard rudder-bar 25 is provided and has cables 26 running back to the usual rudder 27 and also has cables 28 and 30; the former being attached to a bellows leaf 29 and the latter being attached to a bellows leaf 31 so that the rudder bar may be operated by bellows power as well as by foot power.

The ailerons and the elevator are automatically controlled by a system of master poises acting through the medium of electrically controlled valves of air-pressure lines which respectively control the elevator bellows 23—24 and the aileron bellows 10—13.

The rudder is automatically controlled through a master device here shown as including an earth inductor compass C whose action is to close electrical circuits including armature-valves which in turn control air pressure means leading to the power bellows 29—31 of the rudder so that the rudder is controlled automatically by the earth inductor compass, or its equivalent.

Referring to Figs. 2, 3, 4 and 5 there is shown a box 32 which is fixed to any suitable fixed element B of the airplane and which will be called the poise-box. In this is a substantial frame 33 having end legs 34 hung on trunnions 35 in box 32.

This frame 33 is manually set by a pitch regulator which includes a post 36 having a shoulder 37 down against which is pulled the top of the frame under the action of a spring 38. The post is adjusted by a crank shaft 39 having a dial knob 40 accessible by the pilot and which he turns to tilt the frame part 33 up or down on its trunnions and thus determine the horizontal flying position of the ship.

The spring 38 allows an upward yield of the top 33 as to the post and a pneumatic, automatic device aids the spring in holding the top frame 33 in regulated position.

This means includes a bellows $a'$ on the top frame 33 and whose leaf 41 has its free end attached to a suitable support, as a swaying prop 42 standing in the box 32. When the bellows $a'$ is exhausted atmospheric pressure tilts the frame part 33 over and down onto its adjusting post shoulder 37. This action is to maintain the ship on a given flight angle.

A means is also provided to automatically raise the frame part 33 from its adjusting shoulder 37 when desired for the purpose of increasing the diving angle so as to attain a safe flying speed after a possible stall; or when reaching a desired altitude such action varying the automatic control means which regulates the elevator apparatus. This means includes a suitable speed indicator I, Fig. 6, with which is combined a commutator contact 45, movable by the indicator action according to the speed of the ship. An adjustable contact brush 46 is set by an index arm 47 at a position of desired safe flying speed and when the ship's speed falls, from normal (arbitrary) speed, to such index speed then the contact 45 engages the brush 46 and a circuit is closed to an electromagnet 48. This then draws over an armature-valve 49 and opens tube 50 of a chamber 51 whose diaphragm 52 has a disc valve 53 to close or open a vacuum chamber 54 to a by-pass line 55 which leads to a bellows $a$. This bellows is attached to the frame part 33 and its leaf has its working end attached to a prop 56. The vacuum chamber 54 has a pipe 57 leading to a vacuum apparatus, not shown but which may be the air speed indicator Venturi tube. Thus, when the safe flying speed (i. e. below normal) is indicated the bellows $a$ is exhausted through the opened valve 53 just as soon as the armature-valve 49 opens pressure tube 50 to the diaphragm 52; the tube 50 being normally closed.

The pitch control bellows $a'$ has a vacuum line 60 to its diaphragm chamber 61 and this has a pressure pipe 62 which is normally open at armature-valve 49 so that tension acts from vacuum pipe 57 through chamber device 61 and evacuates bellows $a'$ which therefore is effective to press the frame part 33 onto its regulator stop 37 and fix the variable pitch of the ship.

It will be noted that the bellows $a$ acts under control only of the speed indicator I and an altimeter, later described, through the electromagnet 48 and is inert while its line 55 is open above the disc-valve to atmosphere; meantime the bellows $a'$ is in full effect through its pneumatic device 61 and vacuum lines 60—57 since valve line 62 is open at the armature-valve. Manual pitch regulation by device 36—40 has no action on the automatic, speed controlled mechanism just described.

The tilting frame 33 has arms 34 set in end pairs and between these is a group of arms 34' set transverse to the frame. To secure automatic action of the aileron bellows 10—12 and of the elevator bellows 23—24 there is mounted in paired arms 34 or 34' a gravity sensitive device, there being one for right tip, one for left tip, one for climb angle and one for descent angle.

Each such device consists of a poise element 70, Figs. 2 and 3, of suitable form and weight and which has a pivot 71 well off and above its center of gravity; this pivot being in the upper end of a swinging carrier, here a yoke 72, Fig. 5, having horizontal trunnions 73 in respective paired arms 34 (or 34') as the case may be. The yoke 72 (in each case) is limited to play between its arms by adjustable screws 74 on opposite sides of the perpendicular from the trunnions, 73, Fig. 2; which latter it will be seen, are materially, and directly, below the axis 35 of the frame 33 further, the center of gravity of the poise 70 is above the axes 35—73.

The poise 70 has at its top a radial pin 75 which has limited oscillation between stops 76—77 which are at opposite sides of the arm center from the axis 73. The arms 34 and 34' are perpendicular as here shown, to the frame part 33 and thus when the frame arms are vertical the poise yokes 72 are free to float on their pivots 73. As the frame part (stop) 76 is moved over toward the pin 75 this is engaged and pressed to left (Fig. 2) and in so doing opens a contact 80 on yoke 72, from a spring contact 81 which is fixed to the frame 33 and thereby breaks a circuit 82 Fig. 4, including an electromagnet 83. This same circuit has a parallel short circuit 84 closable by a manual switch 85 at the pilot's instrument board (not shown) to nose ship up or down at will.

Opening movement of yoke 72 is stopped by one screw 74, Fig. 2.

Assuming the parts to be manually set by the regulator knob 40 to position of Fig. 2 to hold a flying angle, then if the ship noses down the poise, say D, Fig. 5, falls forward, Fig. 4, and closes contacts 80—81 and energizes magnet 83 with the result that an armature valve 86 is attracted and opens a pressure tube 87 of a pneumatic action, later described and operative to restore ship to regulated position and in so doing tilts the poise 70 (D) back to normal and opens the contact 80.

It will be seen that the frame 33 is relatively, but adjustably fixed with the box 32 and this is fixed with the ship; the regulator 40—36 being the adjusting means.

Hence the several poises 70, of which four are shown, at D—D', for pitch control, and E—E' for lateral control, Fig. 5, may float according to pitch and dip as determined by the axis of the carrier yoke 72; these playing between their stop screws 74 and the poise pins being stopped by the adjacent shoulder 76 or 77, according to the angle of the ship. The lateral control poises are not affected by variation of the pitch frame 33.

The poises D—D' are normally hung with their yokes 72 set in reverse position as to the center 73, and the poises E—E' (of the same structure as in Fig. 2,) are hung on and with their yokes in reverse set as to their axes.

When the ship tips aileron control poise 70 (E') falls to the low side and this will close contact 80 and draw armature 86 and open tube 87 and close tube 88. Tube 87 then opens to a diaphragm chamber 89 and creates pressure under its valve 90 and this rises and connects vacuum line 91 to bellows 13 which is connected to the sleeve shaft 7 and so operates the lever 5 and thereby the stick 2.

The stick is by this means pulled to right or high side and the ship is brought to neutral by its ailerons; these being coactive.

As soon as the ship gets to neutral level the relative (actuating) governor poise automatically gravitates to its normal, ineffective position and in so doing opens the pressure line 88 and closes pressure line 87. Fig. 1.

During the time that a bellows head, as 13 of the right stick 2, is active then a slide valve 92 (which also serves left stick) is down and opens line 88' which leads to diaphragm chamber 93 and throws pressure in and shifts valve 94 so that this will open vacuum line 95 to bellows 10 and this will restore the stick to neutral. Action of the bellows 10 going back to its neutral stroke brings bellows 13 back to neutral and sets the slide valve 92 to neutral, and this shuts off pressure line 88.

Thus bellows valve 90 acts to pull right stick for automatic recovery from left tip and it also brings to neutral from left stick and the bellows valve 94 has corresponding actions on the left stick.

It will be seen that any governor poise 70 acts to control co-related valves as 90 and 94, of its organization. It is also understood that the chambers 89—93 are similar to chamber 54, with its pressure and vacuum functions.

The control of the elevators through poises E—E' is the same as of the ailerons, but the relative automatic, restoration slide valve 100 is attached to bellows 23 so that depressed bellows, as 24, will be pulled back to normal by opening bellows 23 to its vacuum line 101.

If a steady angle of climb for a time is desired the frame 33 is tilted relative to the ship by knob 40 and this action throws the climb poise ahead just the same as if the ship nosed down. As the ship assumes the desired angle of climb the climb control poise tips back to the new normal position. Any variation of this angle of climb will automatically be corrected by the two co-relative climb and the descent poises D—D'.

To return to normal level flight position the pilot re-sets the dial 40 to 0.

It will be seen that a descent angle can be obtained by the simple setting of the dial to the desired index position reverse to the above operation.

During speed above safe flying speed the bellows $a'$ is under vacuum tension and at atmospheric pressure and this causes the frame 33 to press down against the manual pitch regulator 37 this being the constant position at all times above safe flying speed. Should the flying speed fall below safety then the armature 49 Fig. 6, is drawn down by the closed circuit 48 with the result that the pressure line 55 to bellows *a* is opened and this bellows acts to tip the frame 33 the same way as if the ship nosed up, which, by action of the climbing poise closes the relative circuit and by action of the bellows 23—24, connected to the elevator control line 17—18, which are attached to the stick, and move it forward to cause ship to nose down and pick up flying speed again.

As soon as safe flying speed is reached the circuit of electromagnet 48 is broken and the frame 33 comes to normal.

Bellows 31 and 29 have vacuum lines 131 and 129 to diaphragm valve chambers 132—133 respectively, which are of the same type as above described.

The rudder R is kept on a given course by an automatic means. This may include a standard earth-inductor compass or a bank-and-turn indicator C. In either case a commutator 135 is secured to its shaft and has a semi-circular contact 136.

This when turning one way closes a magnet circuit 138 which results in pulling over armature 139 which opens line 141 and movement of the contact 136 in the opposite direction closes magnet circuit 140 which opens line 142. These pressure lines 141 and 142 lead to valve chambers 133—132 and thereby turn vacuum to either bellows 29 or 31.

If the ship turns to right the earth compass pointer turns right and closes the circuit 140 which will pull over armature 140' of pressure line 142 and this opens the diaphragm valve of line 131 with the result that the rudder bar 25 is pulled to give left rudder.

It is understood that if the ship turns left the reverse action of commutator 135 causes pressure line 141 to be opened and work diaphragm valve connected to the vacuum line 129.

To get the rudder back to neutral after recovery from variation off course an automatic slide valve 145, which is connected to bellows 29, is thereby actuated and opens that pressure line 141' or 142' which was closed; this slide valve being of the same type as illustrated in Fig. 7.

The poises D—E—E' have contacts similar to contact 80 for closing relative armature circuits 83ᵃ—83ᵇ—83ᶜ so that the respective armature valves shown may be drawn to open pressure lines to the respective diaphragm chambers as clearly shown in Fig. 1, the bellows-actuated slide-valve 100 controlling the vacuum lines 101—101' from a dual diaphragm chamber 100ˣ.

The magnet circuits 83—83ᵃ are provided with short circuit switches 85—151 so that elevator apparatus can be controlled independently of the poises.

Short circuit switches 152—153 are provided to close circuits 138—140 at will.

It is also desirable to provide means to automatically give down pitch or horizontal flight when the ship has reached a predetermined altitude. To that end any suitable form of altimeter A Fig. 6, is utilized and is provided with a contact 160 movable by the altimeter mechanism, as a shaft 161 thereof. A manually set brush 162 is movable to a desired height index on the altimeter scale, and during ascent when the set altitude is reached the contact 160 will engage the adjustable, height-determining brush and this will close a short circuit 163 to the magnet 48, in the same manner as the speed indicator I. This will result in action of bellows *a* and automatically prevent ship from further ascent.

If for any reason it is desired to operate ship wholly by manual power then it is only necessary to break the vacuum effect in the main pipes 57, or to break the electric circuits of the poise apparatus so that the magnetic controls cannot work.

What is claimed is:

1. In an airplane control apparatus of the class described; a manual stick with elevator and aileron linkage, a sleeve shaft and a spindle in said sleeve, both connected to said linkage, a pair of bellows connected to said sleeve and a pair connected to said spindle to operate the respective linkage in relative to and fro motions, and an automatic control means for said bellows.

2. In an airplane control apparatus, a spindle having double action connection with elevator linkage, a sleeve mounted on said spindle and having double action connection with aileron linkage, opposite-action levers fixed on said sleeve and connected to respective pneumatic actuators, opposite-action levers fixed on the spindle and connected to respective pneumatic actuators, and automatic control valves for said bellows provided with an automatic recovering-control valve means for said valves and being connected to operative parts of said bellows.

3. In an airplane control apparatus, a rudder bar, and its rudder train, a pair of reversely acting bellows attached to said bar to operate it, a master pneumatic control valve device serving the bellows, a set of armature valves for the bellows, a controlling compass having circuits connected to control said valves automatically, and a neutralizing valve connected to one of the bellows to effect neutralization of the rudder after its automatic action.

4. In an airplane control apparatus, a rudder bar, and its rudder train, a pair of reversely acting bellows attached to said bar to operate it, a master pneumatic control valve device serving the bellows, a set of armature valves for the bellows, a controlling compass having circuits connected to control said valves automatically, and a neutralizing valve connected to one of the bellows to effect neutralization of the rudder after its automatic action; and said circuits having shorting switches to effect manual closure at will.

5. In an airplane control apparatus; a fixed poise-mount, and an automatic control mechanism therein including a main frame which is pivoted on the mount on horizontal trunnions, manually operable means to set the angle of the frame, and a system of floating-pivot poises with carriers disposed on trunnions which are transverse to the axis of oscillation of the frame.

6. In an airplane control apparatus; a fixed poise-mount, and an automatic control mechanism therein including a main frame which is pivoted on the mount on horizontal trunnions, manually operable means to set the angle of the frame, and a system of floating-pivot poises with carriers disposed on trunnions which are transverse to the axis of oscillation of the frame; and means for prescribing the direction of tilt of the said carriers as to the frame.

7. In an airplane control apparatus, a tiltable frame, a system of upright carriers having trunnions below and at a right angle to the axis of tilt of the frame, and a system of poises hung in the carriers and having axes above that of the frame and parallel to those of the carriers.

8. In an airplane control apparatus, a tiltable frame, a system of upright carriers having trunnions below and at a right angle to the axis of tilt of the frame, and a system of poises hung in the carriers and having axes above that of the frame and parallel to those of the carriers; and electrical circuits including contacts carried by said frame and mutual contacts associated with the poise carriers for controlling remote elements of the control apparatus.

9. In an airplane control apparatus, the combination with a support attached to a rigid element of the airplane; of a gravity sensitive poise which has trunnions, and a carrier for the trunnions provided with pivots on said support below and parallel to the axis of the poise trunnions; so that the carrier swings above and across its own pivot axis in correspondence with the motion of the relative motion of the poise when the support tilts as to the horizon.

10. The combination with a dirigible vessel having navigation surfaces and manual controls therefor, of an automatic control apparatus including a gravity sensitive master device consisting of a carrier having a horizontal axis of oscillation which is fixed as to the vessel, said carrier being disposed above the axis and tilting to and fro across a plumb line through the axis when the vessel changes angle as to the horizon, and a poise having its center of oscillation above its center of gravity and which is suspended on and by the carrier; the poise acting to shift the carrier according to tilt of the vessel.

11. In an airplane control apparatus, the combination with a support attached to a rigid element of the airplane; of a gravity sensitive poise which has trunnions, and a carrier for the trunnions provided with pivots on said support below and parallel to the axis of the poise trunnions; so that the carrier swings above and across its own pivot axis in correspondence with the motion of the relative motion of the poise when the support tilts as to the horizon, said poise having buttress horns at the top, and limit stops engageable by said horns to form fulcra as the poise reaches either limit.

GEORGE DE BEESON.